UNITED STATES PATENT OFFICE.

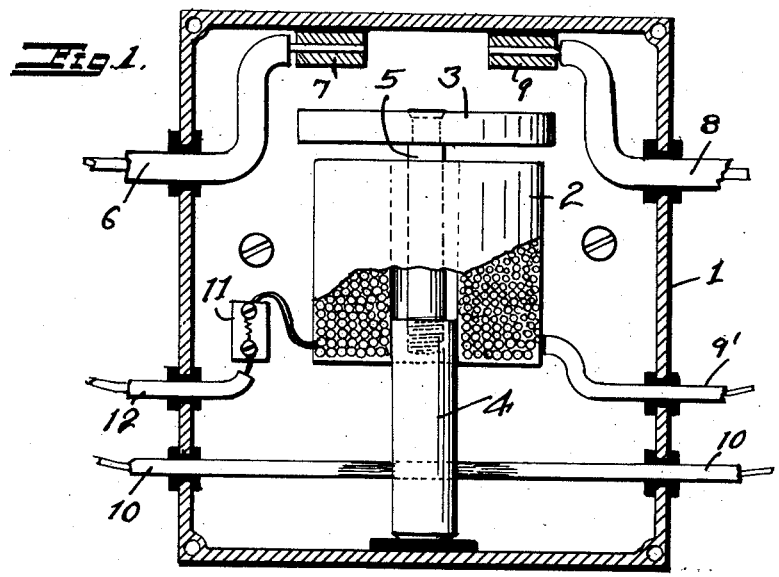
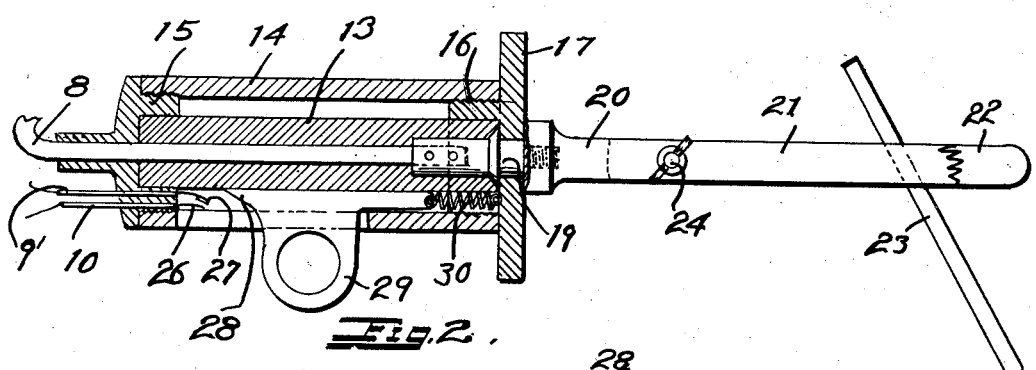
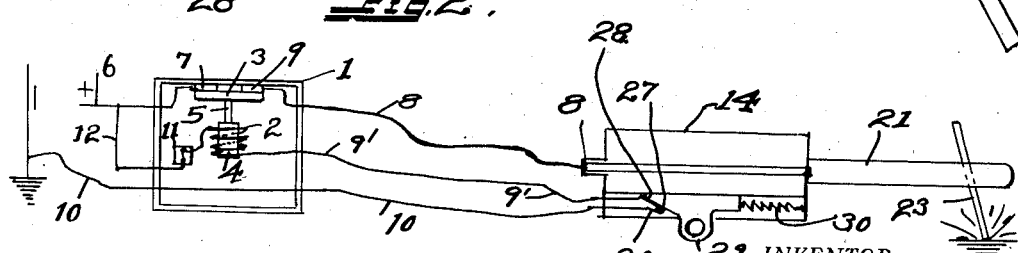

PHILIP J. WALSH, OF SAN FRANCISCO, CALIFORNIA, ASSIGNOR TO CARL PHILIP, OF SAN FRANCISCO, CALIFORNIA.

ELECTRIC WELDING APPARATUS.

1,413,304.    Specification of Letters Patent.    Patented Apr. 18, 1922.

Application filed December 6, 1920. Serial No. 428,427.

*To all whom it may concern:*

Be it known that I, PHILIP J. WALSH, citizen of the United States, residing at San Francisco, in the county of San Francisco, State of California, have invented a new and useful Electric Welding Apparatus, of which the following is a specification in such full and clear terms as will enable those skilled in the art to construct and use the same.

This invention relates to an electric welding apparatus and its object is to provide an electric welding apparatus which will be so arranged as to prevent danger of fire due to the welding handle or pole piece inadvertently coming into contact with parts of the ship or welding table not intended to be welded.

It will be understood by those skilled in the art that with the ordinary welding apparatus that the workman is provided with a handle carrying an electrode which in turn holds the welding electrode, which is melted off as the work proceeds.

With the ordinary apparatus of this kind, if the workman drops the electrode upon the deck of a ship or upon the work table, a blinding flash occurs and often considerable damage is done before the handle can be picked up.

With the present invention if the workman drops the handle and electrode upon the deck an automatic switch at once disconnects the welding circuit, at some remote place and prevents any fire or injury to the apparatus or to the ship or shop.

A further object of the invention is to provide an electric welding apparatus which will protect the circuits from injury as well as prevent the danger of fire to the cable carrying the circuits to the welding apparatus from the source of power be accidentally severed or short circuited by metal bars falling on the same or by a metal wheel accidentally breaking the cable insulation.

Other objects of the invention will appear as the description proceeds.

An embodiment of the invention is shown in the accompanying drawings in which the same reference numeral is applied to the same portion throughout, but I am aware that there may be modifications thereof.

Figure 1 is a sectional view of a casing showing the relay installed therein.

Fig. 2 is a sectional view of the welding handle showing the electrode holder secured thereto, the end of one of the electrode holder forks being broken away for purposes of illustration.

Fig. 3 is a diagrammatic view showing the arrangement of the apparatus in connection with the relay.

The numeral 1 indicates a suitable casing which may be installed in any safe location at a distance from the welding operations. Within this casing there is a relay coil 2, which has a contact plate 3 above it. This plate is secured to the top of an iron plunger 4 by means of a suitable non-magnetic rod 5.

The welding current is received through a suitable heavy cable 6 which is connected with the terminal plate 7 and the current is sent to the welding apparatus through the cable 8 which is connected to the terminal plate 9.

Extending along the cable 8 to the welding apparatus are two wires 9' and 10, the former of which is connected to one terminal of the coil 2 and with a fuse 11 at the other terminal of the coil from which fuse a wire 12 extends to a suitable source of electric current supply.

The welding apparatus comprises a pair of tubes 13 and 14 made of a suitable insulating material and connected together by means of the bushing 15 and disc 16, the latter on a disc 17.

Extending through the tube 13 is the heavy current cable 8 which is connected to a plug 19 extending through the disc 17.

The electrode holder 20 is screwed on the end of the plug 19 and it has two arms 21, 22 which are held in engagement with the electrode 23 by means of a bolt 24.

The wires 9' and 10 extend through the bushing 15 and terminate in two spring contacts 26, 27. These spring contacts are brought together by means of a wedge 28 on a slidable handle 29. Said handle is normally held in the position shown in Fig. 2 by means of a spiral spring 30.

In operation the current is supplied to the wires 10, 12 and 6, the opposite terminal of the generator supplying the heavy current that passes to the cable, this being grounded on the ship or upon the welding table.

The operator thereupon picks up the handle 14 and places the electrode in position between the fingers 21 and 22, where it is tightly secured by means of the screw 24. Thereupon the operator will charge the electrode 23 by pulling back the trigger 29 which will at once lift the plate 3 into contact with the plates 7 and 9. As long as the operator desires to continue work he will hold the trigger 29 engaged with the contacts 26 and 27, but should he drop the welding apparatus or inadvertently swing it against something, he will ordinarily have disconnected the trigger 29 from the contacts 26 and 27, and the current will be cut off from the cable 8 extending from the relay box.

It is to be noted that ordinarily the cable from the relay box to the welding apparatus will be from 50 to 60 or 100 feet long and should a car or any other piece of apparatus fall upon said cable, break either of the wires 9' or 10, the current would be immediately cut off from the wire 8 and prevent any damage due to short circuiting of said wires.

What I claim is as follows, but various modifications may be made in the construction shown in the drawings and above particularly described form, within the purview of my invention.

1. In a welding electrode holder, a handle having a space therein, a pair of spring contacts disposed in said space, and means for operating these contacts comprising a wedge slidable in the space, means for normally holding the wedge separate from the spring contacts, and manual means for sliding the wedge so as to operate the contacts.

2. In a welding electrode holder, a handle having a hollow tubular space therein, a pair of flat springs disposed in said space, contacts on said springs for controlling the supply of current to the holder, and means for closing these contacts comprising a wedge slidable in the space formed so as to urge the springs together, a spring tending to separate the wedge from the contact springs, and a handle for the wedge extending outside the space for manually sliding the wedge.

In testimony whereof I have hereunto set my hand this 24th day of November, A. D. 1920.

P. J. WALSH.